Patented Jan. 17, 1939

2,144,446

UNITED STATES PATENT OFFICE 2,144,446

PRESERVATION OF RUBBER

Ira Williams, Woodstown, N. J., and Arthur Morrill Neal, Wilmington, Del., assignors to E. I. du Pont de Nemours & Company, Wilmington, Del., a corporation of Delaware No Drawing. Application December 24, 1935, Serial No. 56,086

14 Claims. (Cl. 18—50)

This invention relates to the preservation of rubber and more particularly to rubber having incorporated therein compounds which retard that deterioration which is due to the action of heat and oxygen.

It is well known that rubber in use is frequently subjected to the action of heat and of oxygen, as a result of which the rubber rapidly deteriorates. It has, heretofore, been proposed to add substances to rubber in order to give the rubber a longer life and to retard deterioration.

Among the many different classes of compounds which have been proposed for this purpose probably the most important have been the secondary aryl amines, such as phenyl beta naphthylamine. These compounds have proved to be satisfactory when incorporated into a rubber mix before vulcanization but are not well adapted for use in latex.

An object of this invention is to provide a new class of compounds which will increase the age-resisting properties of rubber. A further object is to provide a class of compounds which may be easily prepared in aqueous emulsion form for treating vulcanized and unvulcanized latex. Still further objects are to provide a new composition of matter and to advance the art. Other objects will appear hereinafter.

These objects are accomplished by the following invention which comprises incorporating with rubber a compound having the formula:

$$R-\overset{H}{N}-A$$

in which R represents a naphthyl nucleus which may be substituted and A is an alkyl or alkaryl group.

The term "alkyl," as used throughout the specification and claims, is to be understood to include the unsaturated as well as saturated aliphatic radicals.

The term "alkaryl," as used throughout the specification and claims, is to be understood to mean saturated or unsaturated aliphatic radicals joined directly to the nitrogen and having an aryl radical substituted for a hydrogen of the aliphatic radical.

In general the compounds of this class are liquids and will form an emulsion with water. Due to this characteristic, of this class of compounds, they are particularly adapted for use in treating vulcanized and unvulcanized latex by adding the compounds thereto in the form of an aqueous emulsion. They may also be used in treating vulcanized rubber by any of the commonly employed methods of impregnation. The compounds of this class, when incorporated in rubber by any of these methods, give to the rubber greatly increased age-resisting properties.

In order to illustrate the advantageous features of these compounds rubber stocks were mixed according to the following formula:

|  | Parts |
|---|---|
| Pale crepe | 100 |
| Zinc oxide | 100 |
| Sulfur | 3 |
| Stearic acid | 1 |
| Lithopone | 20 |
| Diortho tolyl guanidine | 0.75 |
| Deterioration inhibitor | 1.00 |

These stocks were cured under steam pressure to a comparable state of cure and were then aged in an oxygen bomb for 72 hours at 70° C. under an oxygen pressure of 300 pounds per square inch, with the results indicated in the following table.

| Deterioration inhibitor | Original tensile | Tensile after ageing |
|---|---|---|
| None | 2950 | Completely deteriorated after 48 hrs. |
| Ethyl-beta-naphthylamine | 2875 | 2000 |
| Ethyl-alpha-naphthylamine | 3375 | 2400 |
| Butyl-beta-naphthylamine | 3100 | 2275 |
| Benzyl-beta-naphthylamine | 3125 | 2300 |
| Allyl-beta-naphthylamine | 3225 | 2600 |

Other compounds in this class which deserve special mention are: the methyl, propyl, and higher aliphatic derivatives of both the alpha and beta naphthylamines, and unsaturated derivatives of both alpha and beta naphthylamines, such as crotyl alpha naphthylamine and vinyl beta naphthylamine. Still other compounds which may be mentioned are:

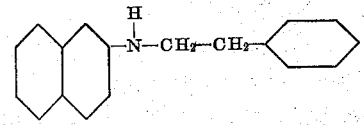

Beta-phenyl-ethyl-beta-naphthylamine

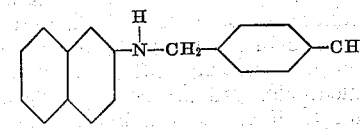

p-Methyl-benzyl-alpha-naphthylamine

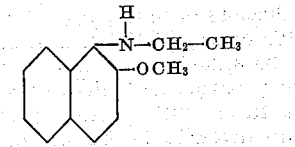

Beta-methoxy-ethyl-alpha-naphthylamine

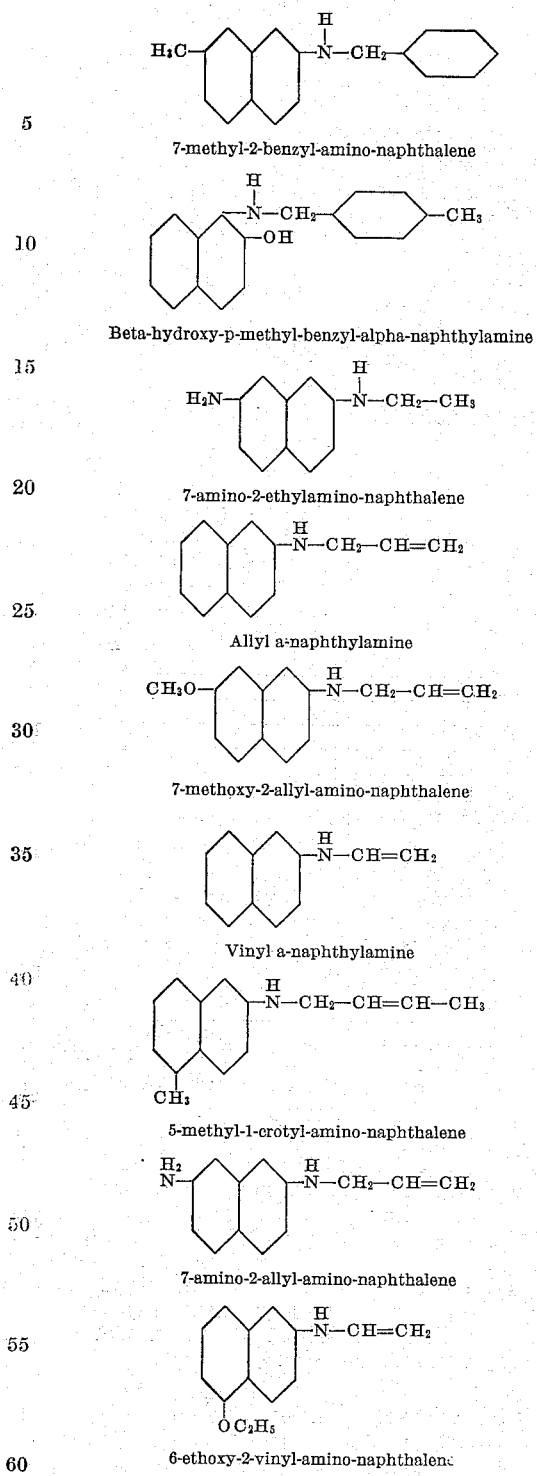

While we have illustrated the effect of these compounds as incorporated into a rubber mix which is thereafter vulcanized, it is understood that they are substantially equally effective when employed as an aqueous emulsion in the treatment of vulcanized and unvulcanized latex and when applied to vulcanized rubber by any of the well known methods of impregnation.

We have disclosed the use of one part of a substance of this class to 100 parts of rubber, however, it is to be understood that these proportions may be widely varied according to the desire of the manufacturer, without departing from the spirit of our invention. We prefer to employ from about 0.5 to 5 parts of inhibitor to 100 parts of rubber as being the most effective, in general practice.

This is in part a continuation of our copending application, Serial No. 596,572, filed March 3, 1932, for "Preservation of rubber".

While we have disclosed certain specific compounds of the class and certain methods of employing the same, it is to be understood that many variations and modifications will appear to those skilled in the art without departing from the spirit of our invention. Accordingly the scope of our invention is to be limited solely by the appended claims considered as broadly as is permissible in view of the prior art.

We claim:

1. The method of preserving rubber which comprises incorporating therein a compound having the formula

wherein R represents a naphthyl nucleus and A represents a member of the group consisting of allyl, crotyl and vinyl.

2. Rubber having incorporated therein a compound having the formula

wherein R represents a naphthyl nucleus and A represents a member of the group consisting of allyl, crotyl and vinyl.

3. The method of preserving rubber which comprises incorporating therein allyl-beta-naphthylamine.

4. The method of preserving rubber which comprises incorporating therein crotyl-alpha-naphthylamine.

5. The method of preserving rubber which comprises incorporating therein vinyl-beta-naphthylamine.

6. Rubber having incorporated therein allyl-beta-naphthylamine.

7. Rubber having incorporated therein crotyl-alpha-naphthylamine.

8. Rubber having incorporated therein vinyl-beta-naphthylamine.

9. The method of preserving rubber in latex which comprises incorporating in the latex an aqueous emulsion of a compound having the formula

wherein R represents a naphthyl nucleus and A represents a member of the group consisting of allyl, crotyl and vinyl.

10. The method of preserving rubber in latex which comprises incorporating in the latex an aqueous emulsion of a compound having the formula

wherein R represents a hydrocarbon radical of the naphthalene series and A represents an unsaturated aliphatic hydrocarbon of the group consisting of allyl, crotyl and vinyl.

11. The method of preserving rubber in latex which comprises incorporating in the latex an aqueous emulsion of allyl-beta-naphthylamine.

12. Latex obtained by the method of claim 9.
13. Latex obtained by the method of claim 10.
14. Latex obtained by the method of claim 11.

IRA WILLIAMS.
ARTHUR MORRILL NEAL.